US011281867B2

(12) United States Patent
Kantor et al.

(10) Patent No.: US 11,281,867 B2
(45) Date of Patent: Mar. 22, 2022

(54) PERFORMING MULTI-OBJECTIVE TASKS VIA PRIMAL NETWORKS TRAINED WITH DUAL NETWORKS

(71) Applicant: International Business Machines Corporation, Armonk, NY (US)

(72) Inventors: Amir Kantor, Haifa (IL); Guy Uziel, Ashdod (IL); Ateret Anaby-Tavor, Givat Ada (IL)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 16/266,078

(22) Filed: Feb. 3, 2019

(65) Prior Publication Data

US 2020/0250279 A1    Aug. 6, 2020

(51) Int. Cl.
| | |
|---|---|
| *G06F 40/30* | (2020.01) |
| *G06F 40/56* | (2020.01) |
| *G06N 20/00* | (2019.01) |
| *G06F 17/11* | (2006.01) |
| *G06N 3/04* | (2006.01) |
| *G06N 7/00* | (2006.01) |

(52) U.S. Cl.
CPC .............. *G06F 40/56* (2020.01); *G06F 17/11* (2013.01); *G06N 3/0454* (2013.01); *G06N 7/005* (2013.01)

(58) Field of Classification Search
CPC .... G06F 40/211; G06F 40/253; G06F 40/268; G06F 40/284; G06F 40/30; G06N 20/00
See application file for complete search history.

(56) References Cited

U.S. PATENT DOCUMENTS

| 6,161,130 A  * | 12/2000 | Horvitz ................ G06K 9/6269 709/206 |
| 6,418,431 B1 * | 7/2002 | Mahajan ............. G06F 16/3346 |
| 7,020,642 B2 * | 3/2006 | Ferguson ............. G05B 13/048 706/21 |
| 7,051,017 B2 * | 5/2006 | Marchisio ............ G06F 16/334 707/713 |
| 8,099,453 B2 * | 1/2012 | Bekkerman ......... G06F 16/2465 709/201 |
| 9,715,496 B1 * | 7/2017 | Sapoznik ................. G10L 15/26 |
| 9,805,371 B1 * | 10/2017 | Sapoznik ............ G06F 16/2237 |

(Continued)

FOREIGN PATENT DOCUMENTS

CN            108804612 A           11/2018

OTHER PUBLICATIONS

Pock et al., Pock, Diagonal preconditioning for first order primal-dual algorithms in convex optimization, 2011, IEEE International Conference on Computer Vision, pp. 1-8 (Year: 2011).*

(Continued)

*Primary Examiner* — Lamont M Spooner
(74) *Attorney, Agent, or Firm* — Barry D. Blount

(57) ABSTRACT

An example system includes a processor to receive data for a multi-objective task. The processor is to also perform the multi-objective task on the received data via a trained primal network. The primal network and a dual network are trained for a multi-objective task using a Lagrangian loss function representing a number of objectives. The primal network is trained to minimize the Lagrangian loss function and the dual network is trained to maximize the Lagrangian loss function.

19 Claims, 13 Drawing Sheets

(56) References Cited

U.S. PATENT DOCUMENTS

| | | | |
|---|---|---|---|
| 9,807,037 B1* | 10/2017 | Sapoznik | G06F 16/9024 |
| 9,836,671 B2* | 12/2017 | Gao | G06F 40/30 |
| 9,950,591 B2* | 4/2018 | Kuroda | B60H 1/32284 |
| 9,990,591 B2* | 6/2018 | Gelfenbeyn | G10L 15/22 |
| 10,133,729 B2* | 11/2018 | He | G06F 40/30 |
| 10,387,888 B2* | 8/2019 | Sapoznik | H04L 67/306 |
| 10,453,074 B2* | 10/2019 | Sapoznik | G06F 40/35 |
| 10,699,060 B2* | 6/2020 | McCann | G06F 40/289 |
| 10,733,614 B2* | 8/2020 | Sapoznik | G06F 40/35 |
| 10,776,716 B2* | 9/2020 | Liu | G06N 7/005 |
| 10,795,022 B2* | 10/2020 | Shintani | G01S 17/89 |
| 11,157,555 B2* | 10/2021 | Checkley | G06F 17/3082 |
| 2003/0126229 A1* | 7/2003 | Kantor | G06F 9/546 709/217 |
| 2003/0139828 A1* | 7/2003 | Ferguson | G06K 9/6269 700/53 |
| 2005/0049990 A1* | 3/2005 | Milenova | G06K 9/6253 706/48 |
| 2008/0072182 A1* | 3/2008 | He | G06F 30/39 716/113 |
| 2011/0295774 A1 | 12/2011 | Chen et al. | |
| 2012/0102037 A1* | 4/2012 | Ozonat | G06F 16/334 707/738 |
| 2012/0150532 A1* | 6/2012 | Mirowski | G06F 40/40 704/9 |
| 2013/0218526 A1* | 8/2013 | Lev | G06F 30/00 703/1 |
| 2013/0254216 A1* | 9/2013 | Yamamoto | G06F 16/3334 707/749 |
| 2016/0219078 A1* | 7/2016 | Porras | H04L 41/12 |
| 2016/0330144 A1 | 11/2016 | Dymetman et al. | |
| 2017/0180276 A1 | 6/2017 | Gershony et al. | |
| 2017/0235824 A1* | 8/2017 | Liu | G06Q 20/10 707/723 |
| 2017/0339076 A1* | 11/2017 | Patil | H04L 51/02 |
| 2017/0372200 A1* | 12/2017 | Chen | G10L 15/22 |
| 2018/0012231 A1* | 1/2018 | Sapoznik | G06F 16/3329 |
| 2018/0013699 A1* | 1/2018 | Sapoznik | G06F 40/205 |
| 2018/0061400 A1* | 3/2018 | Carbune | G06F 16/3331 |
| 2018/0247201 A1* | 8/2018 | Liu | G06N 3/088 |
| 2018/0321347 A1* | 11/2018 | Wang | A61B 5/055 |
| 2018/0357566 A1* | 12/2018 | Liu | G10L 15/197 |
| 2019/0132451 A1* | 5/2019 | Kannan | H04M 3/5235 |
| 2019/0294973 A1* | 9/2019 | Kannan | G06N 3/088 |
| 2019/0311375 A1* | 10/2019 | Sapoznik | G06F 16/245 |
| 2019/0340527 A1* | 11/2019 | Liden | H04L 51/02 |
| 2020/0007380 A1* | 1/2020 | Chen | H04L 41/046 |
| 2020/0027556 A1* | 1/2020 | Xie | G06F 16/36 |
| 2020/0090651 A1* | 3/2020 | Tran | G06N 3/0445 |
| 2020/0104276 A1* | 4/2020 | Parnell | G06N 20/00 |
| 2020/0152184 A1* | 5/2020 | Steedman Henderson | G06N 3/084 |
| 2020/0159827 A1* | 5/2020 | Vozila | G06F 40/35 |
| 2020/0210532 A1* | 7/2020 | Matei | G06F 30/27 |
| 2020/0218780 A1* | 7/2020 | Mei | G06F 40/35 |
| 2020/0327555 A1* | 10/2020 | Sapoznik | G06N 3/04 |
| 2020/0342462 A1* | 10/2020 | Todd | G06F 16/3329 |

OTHER PUBLICATIONS

Peng et al., Peng, Compsosite Task-Completion Dialogue Policy Learning via Hierarchical Deep Reinforcement Learning, 2017, journal={arXiv preprint arXiv: 1704.03084, pp. 1-12 (Year: 2017).*

Yang et al., Personalized response generation by Dual-learning based domain adaptation, 2018 Neural Networks vol. 103, pp. 72-82 (Year: 2018).*

"Notification of Transmittal of the International Search Report and the Written Opinion of the International Searching Authority Issued in PCT Application No. PCT/IB2020/050827", dated May 21, 2020, 9 Pages.

* cited by examiner

300

US 11,281,867 B2

1

PERFORMING MULTI-OBJECTIVE TASKS VIA PRIMAL NETWORKS TRAINED WITH DUAL NETWORKS

BACKGROUND

The present techniques relate to artificial neural networks. More specifically, the techniques relate to training and using neural networks to perform multi-objective tasks.

SUMMARY

According to an embodiment described herein, a system can include processor to receive data for a multi-objective task. The processor can also further perform the multi-objective task on the received data via a trained primal network, wherein the primal network and a dual network are trained for a multi-objective task using a Lagrangian loss function representing a plurality of objectives. The primal network is trained to minimize the Lagrangian loss function and the dual network is trained to maximize the Lagrangian loss function.

According to another embodiment described herein, a method can include training a primal network and a dual network for a multi-objective task using a Lagrangian loss function representing a plurality of objectives. Training the primal network and the dual network includes training the primal network to minimize the Lagrangian loss function and training the dual network to maximize the Lagrangian loss function. The method can further include receiving data for the multi-objective task. The method can also further include performing the multi-objective task on the received data via the trained primal network.

According to another embodiment described herein, a computer program product for training neural networks to perform multi-objective tasks can include computer-readable storage medium having program code embodied therewith. The computer readable storage medium is not a transitory signal per se. The program code executable by a processor to cause the processor to train a primal network and a dual network for a multi-objective task using a Lagrangian loss function representing a plurality of objectives. The program code can also cause the processor to train the primal network to minimize the Lagrangian loss function and train the dual network to maximize the Lagrangian loss function. The program code can also cause the processor to receive data for the multi-objective task. The program code can also cause the processor to perform the multi-objective task on the received data via the trained primal network.

2

Figure 5:
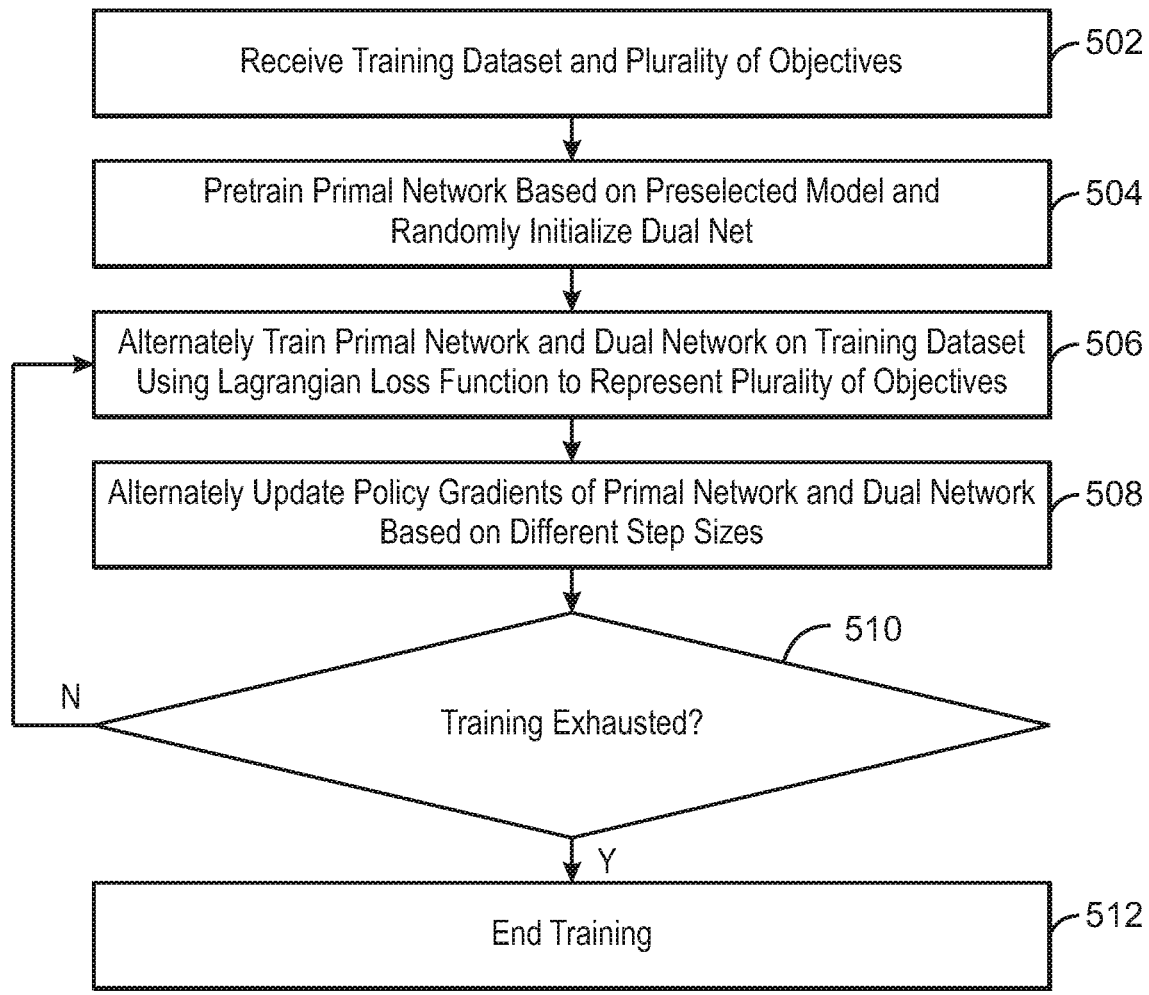
Figure 6:
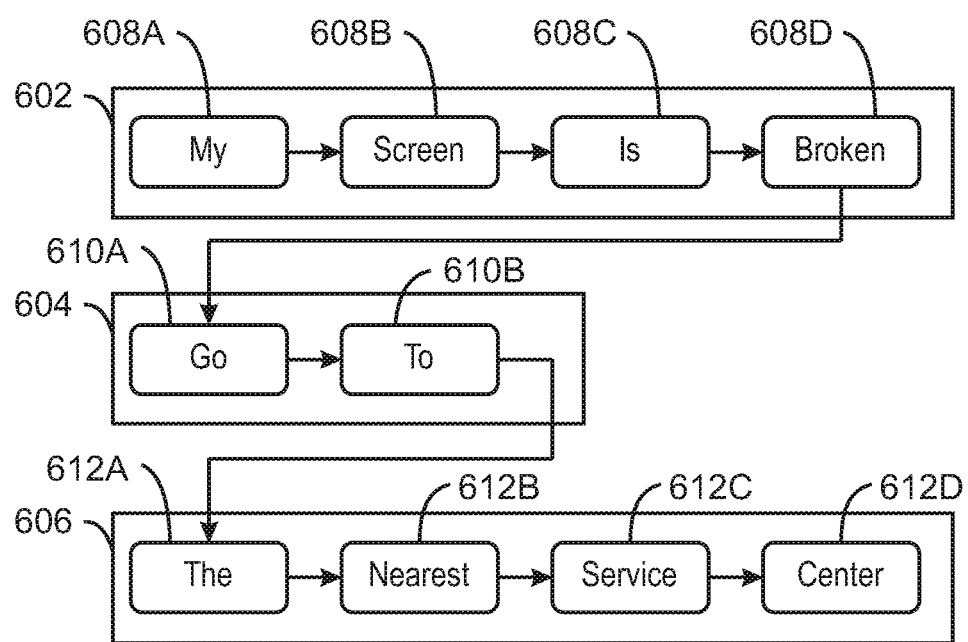
Figure 7:
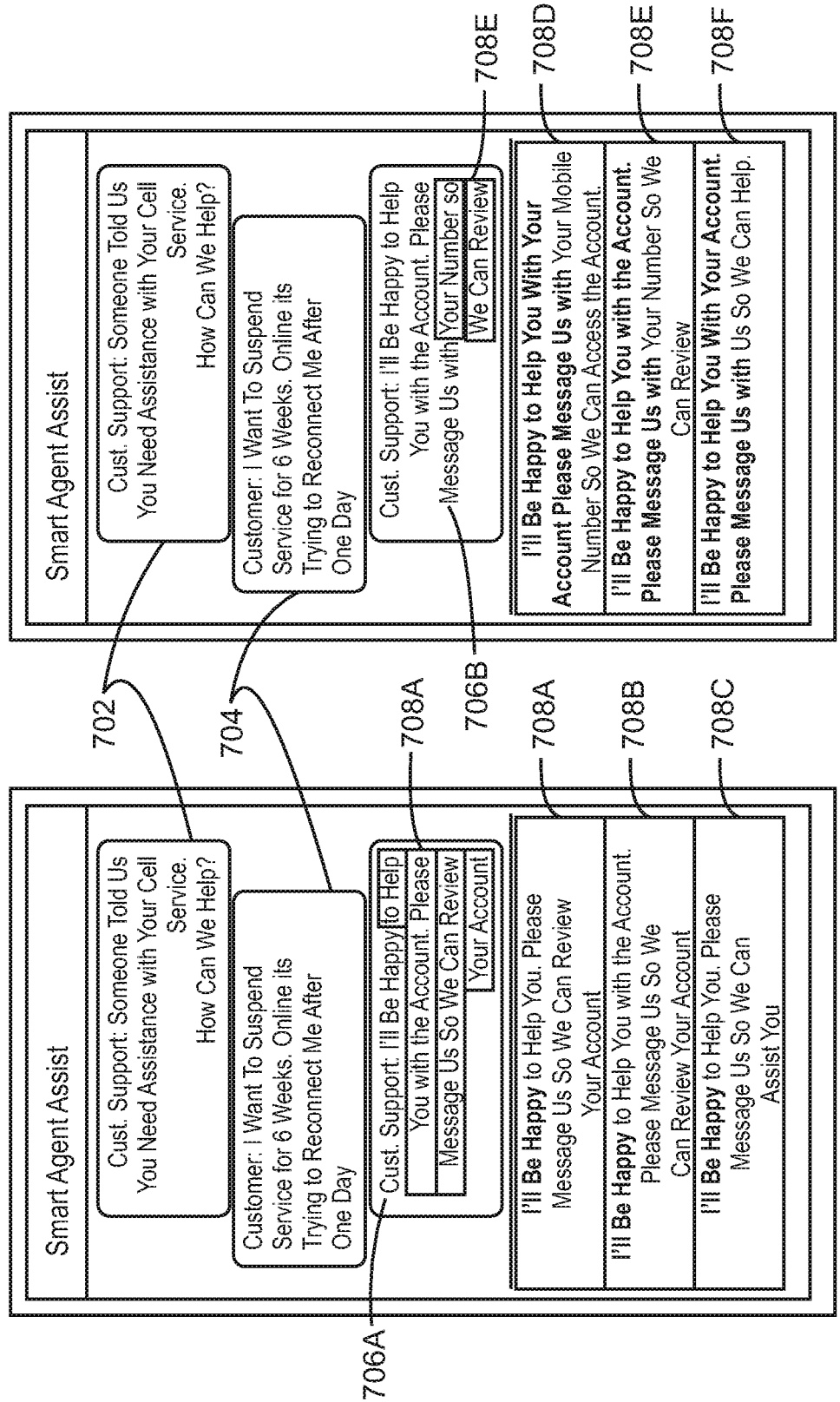
Figure 8:
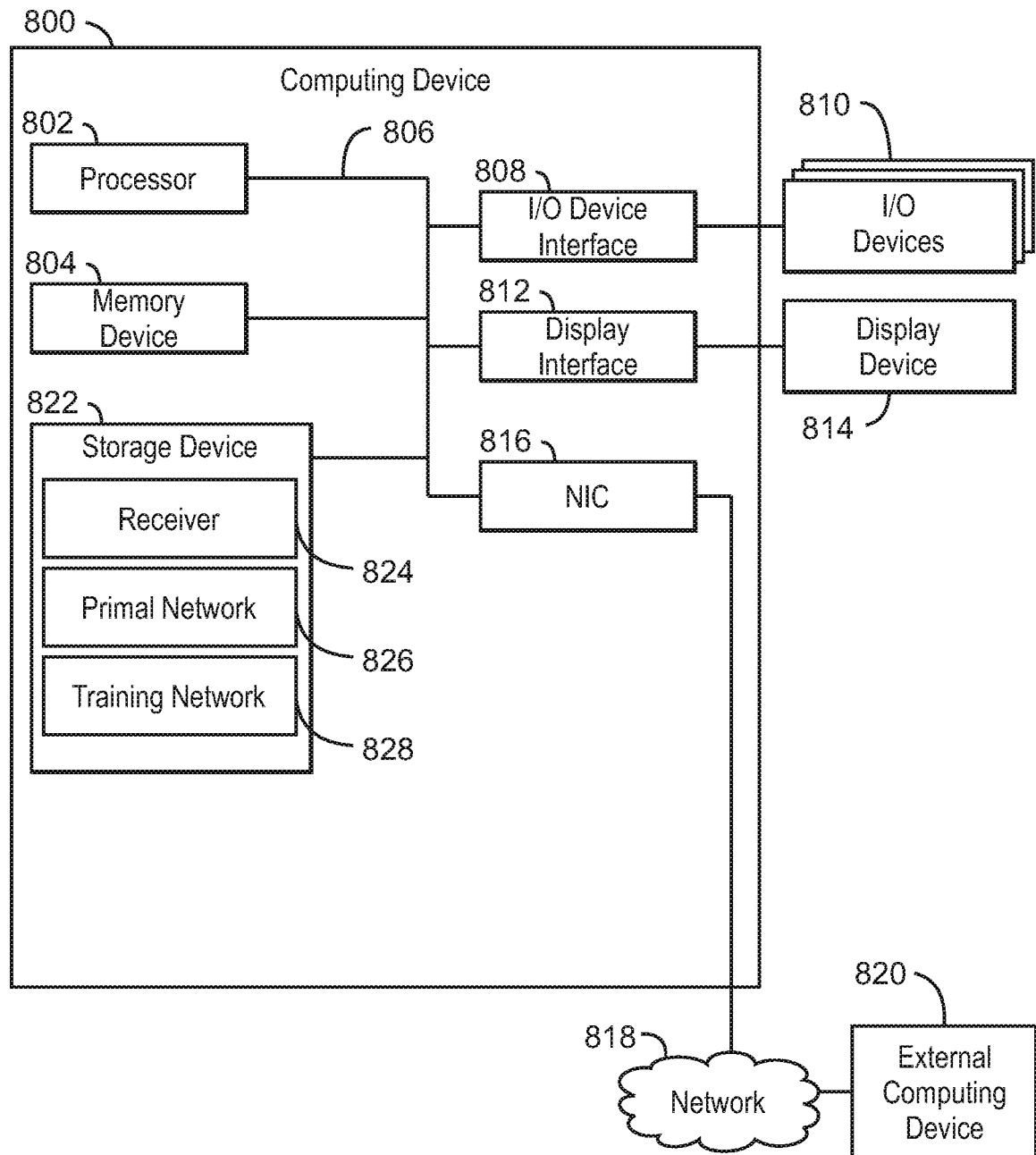
Figure 9:
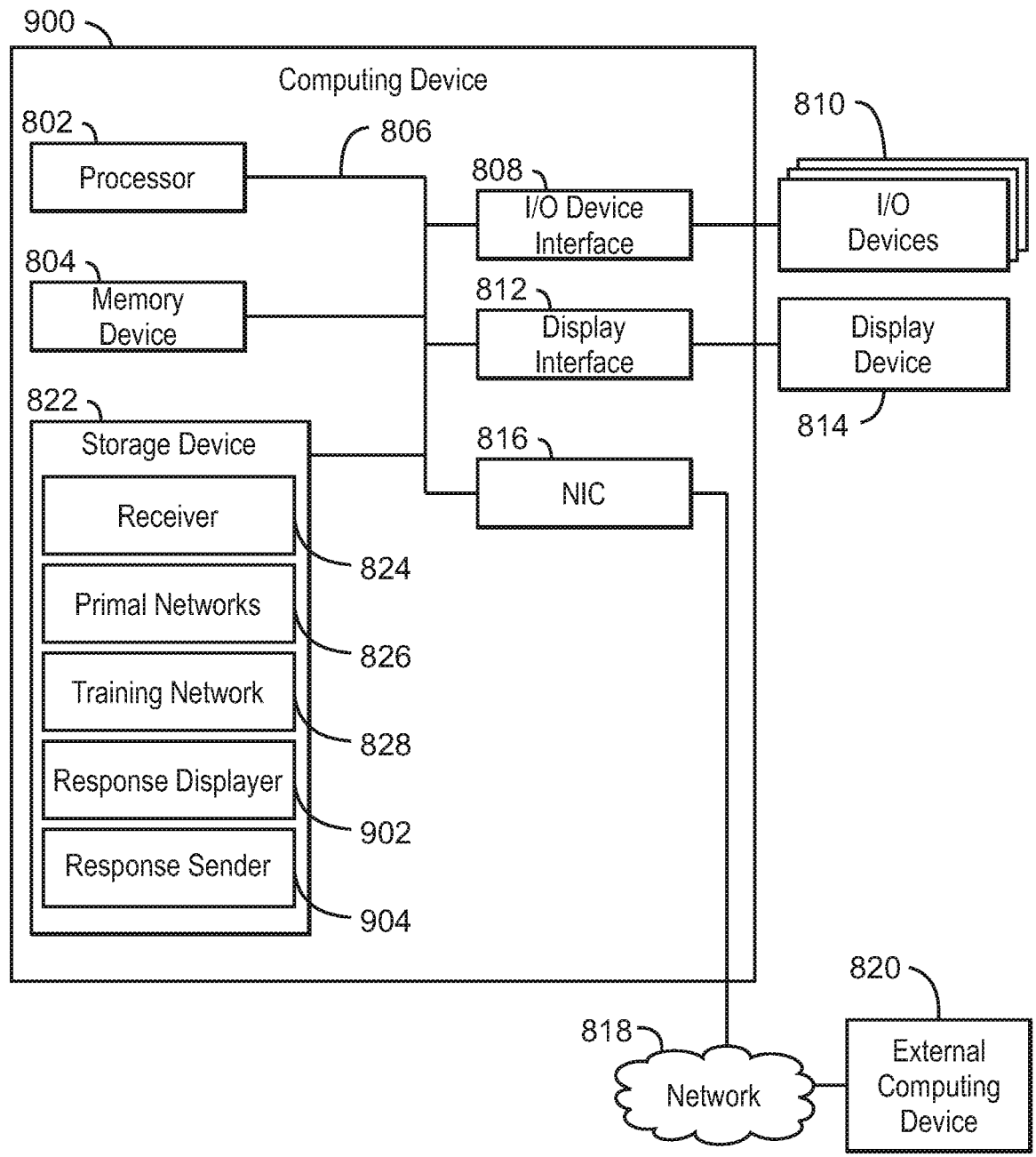
Figure 10:
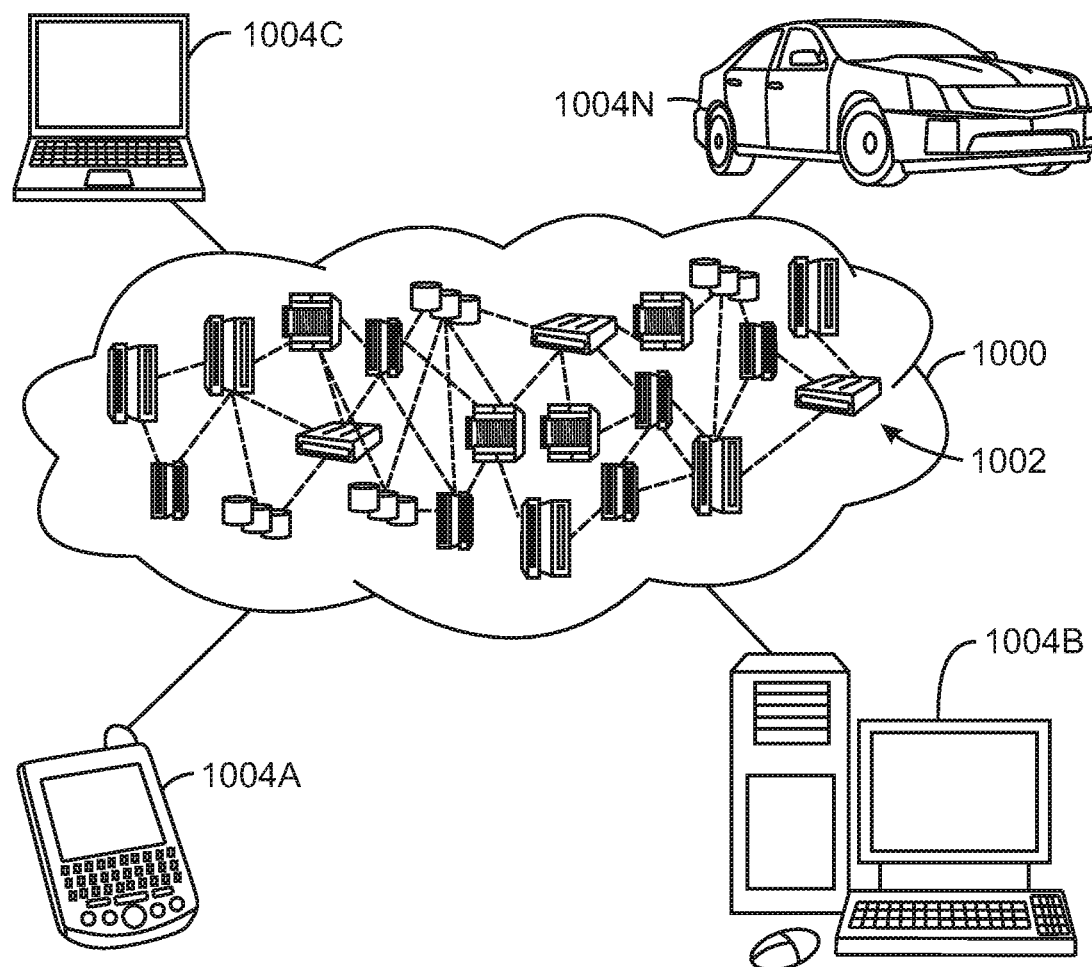
Figure 11:
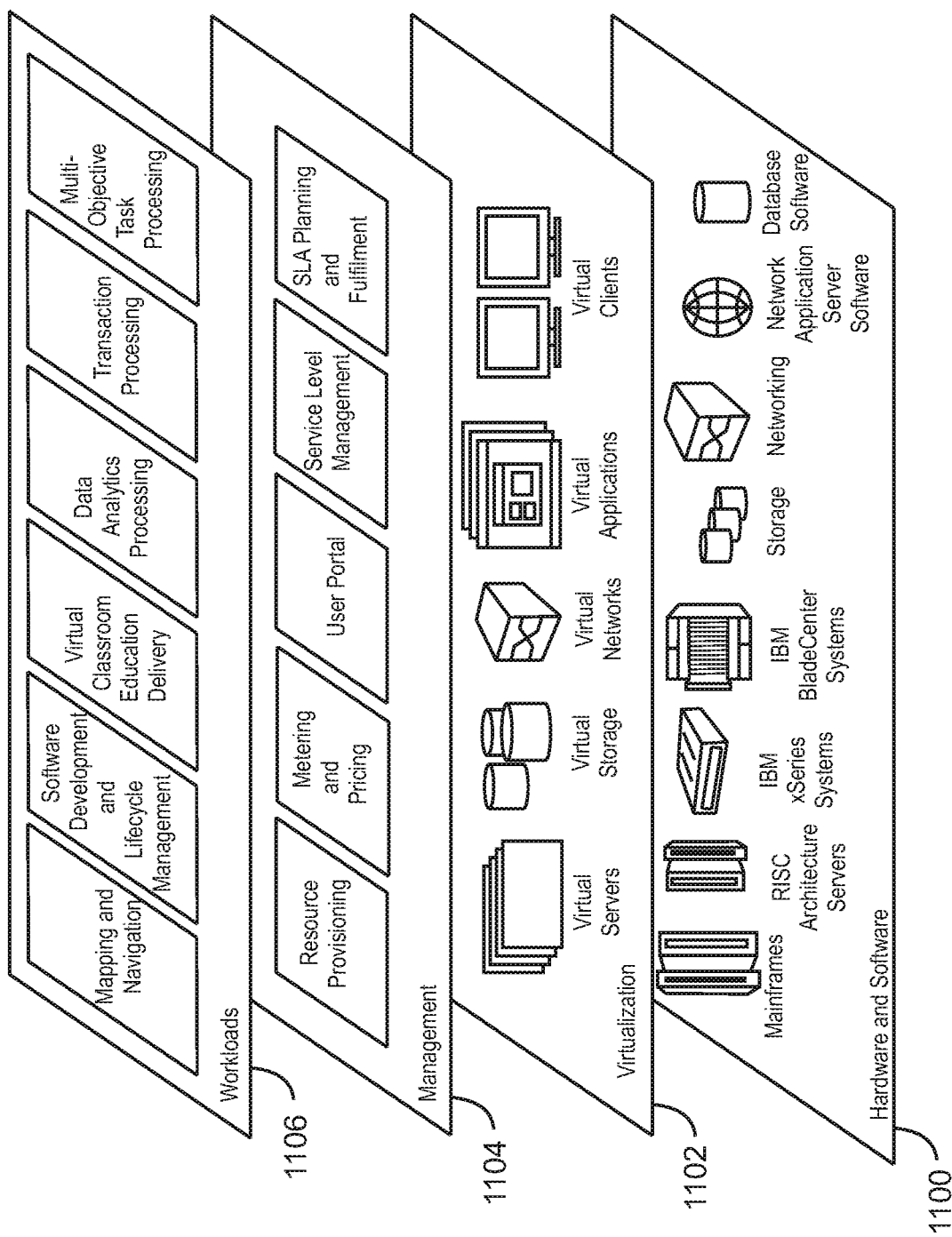
Figure 12:
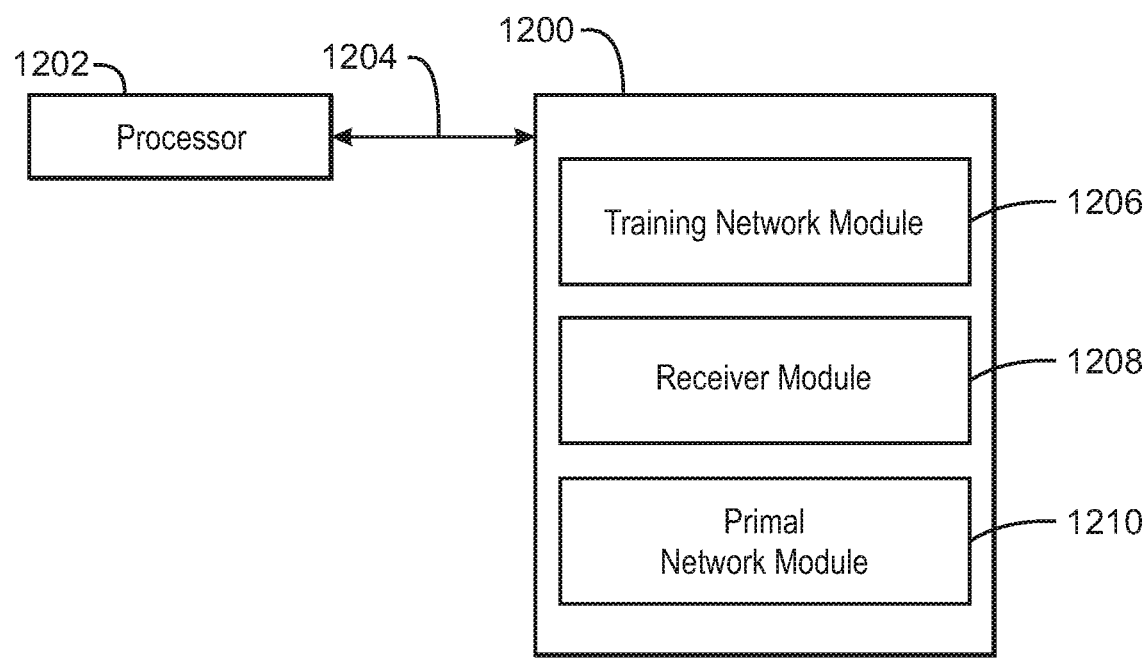
Figure 13:
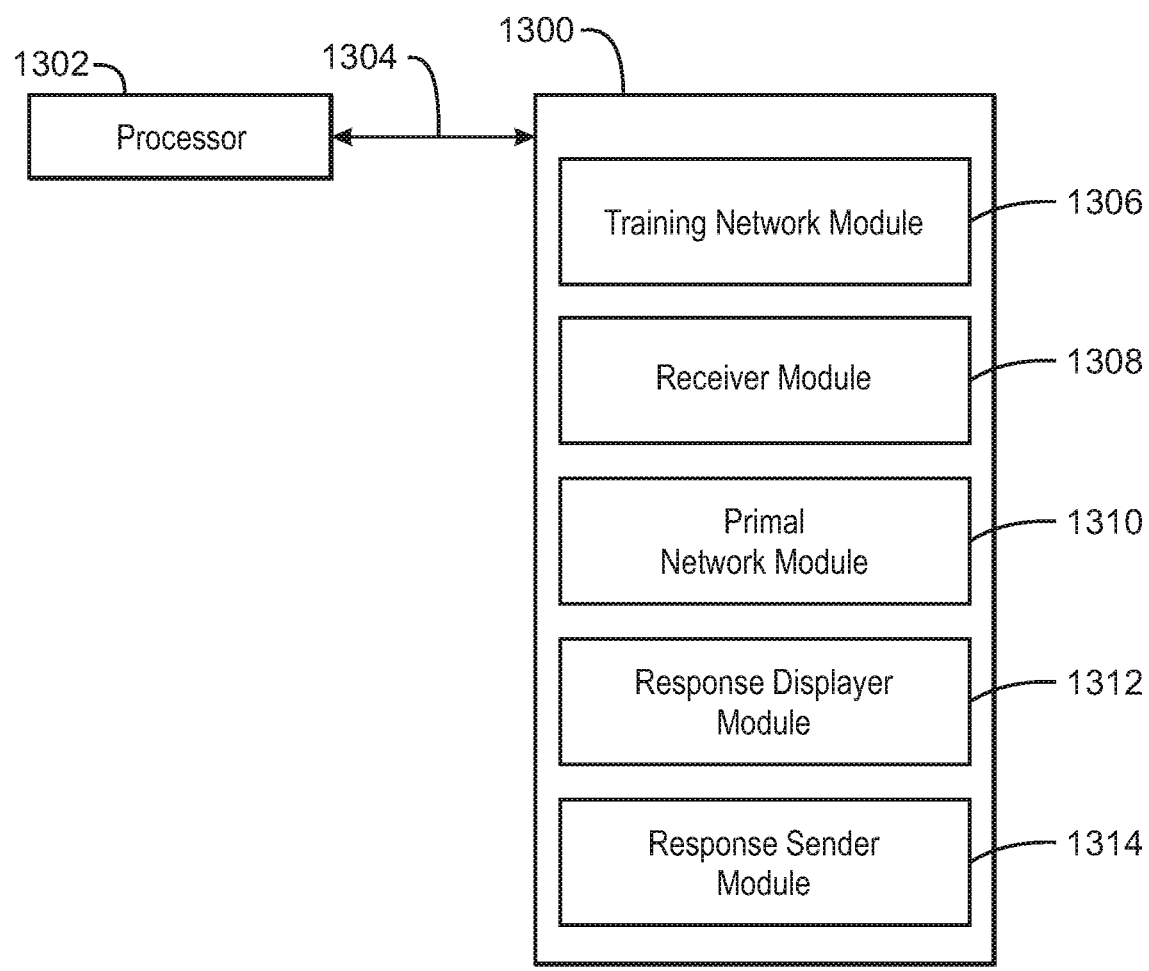

FIG. 5 is a process flow diagram of an example method for training primal networks to perform automated response generation;

FIG. 6 is an example primal neural network including three long short-term memory (LSTM) cells;

FIG. 7A is a diagram of an example chat display including a generated set of completed responses;

FIG. 7B is a diagram of an example chat display including a generated updated set of completed responses;

FIG. 8 is a block diagram of an example computing device that can perform multi-objective tasks using a primal network trained using a minimax neural network architecture;

FIG. 9 is a block diagram of an example computing device that can perform automated response generation using a primal network trained using a minimax neural network architecture;

FIG. 10 is a drawing of an example cloud computing environment according to embodiments described herein;

FIG. 11 is a drawing an example abstraction model layers according to embodiments described herein;

FIG. 12 is a block diagram of an example tangible, non-transitory computer-readable medium that can perform multi-objective tasks using trained minimax neural networks; and FIG. 13 is a block diagram of an example tangible, non-transitory computer-readable medium that can train a primal network to perform automated response generation.

DETAILED DESCRIPTION

Neural networks are trained using objective functions, or loss functions, on training datasets to perform specific tasks related to a particular objective represented by the objective function during training. In some real-world applications, several objectives may be sought to be performed simultaneously. One way of incorporating several objective functions into a learning architecture may be by assigning relative weights to the objectives, which transforms the multi-objective problem into a single-objective problem. However, it may be difficult to optimize such weights, as it may be unclear how to compare different objectives having different units. Moreover, a single-objective approach may not be suitable in cases where the learner needs to satisfy threshold values for some of the objectives. In addition, tuning the weights for incorporating several objectives into one single object and tuning the weights may be computationally difficult.

According to techniques described herein, system can include a processor to receive data for a multi-objective task including a plurality of objectives. The processor can perform the multi-objective task on the received data via a trained primal network. The primal network and a dual network are alternately trained using a Lagrangian loss function representing the plurality of objectives. In one example, the processor can receive a prefix of conversation and a text input. The processor can then generate a completed response based on the prefix of conversation and the text input via a trained primal network. Thus, the techniques described herein enable a neural network to be trained with multiple objectives without the setting of predefined relative weights. In addition, the techniques provide for improved automated and semi-automated responses to inquiries in conversations using a neural network trained on multiple objectives. Moreover, the techniques can be used in a variety of applications, including automated summarization of text, autonomous machines learning to interact with their environment, etc.

In some scenarios, the techniques described herein may be implemented in a cloud computing environment. As discussed in more detail below in reference to at least FIGS. 8-13, a computing device configured to perform multi-objective tasks may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
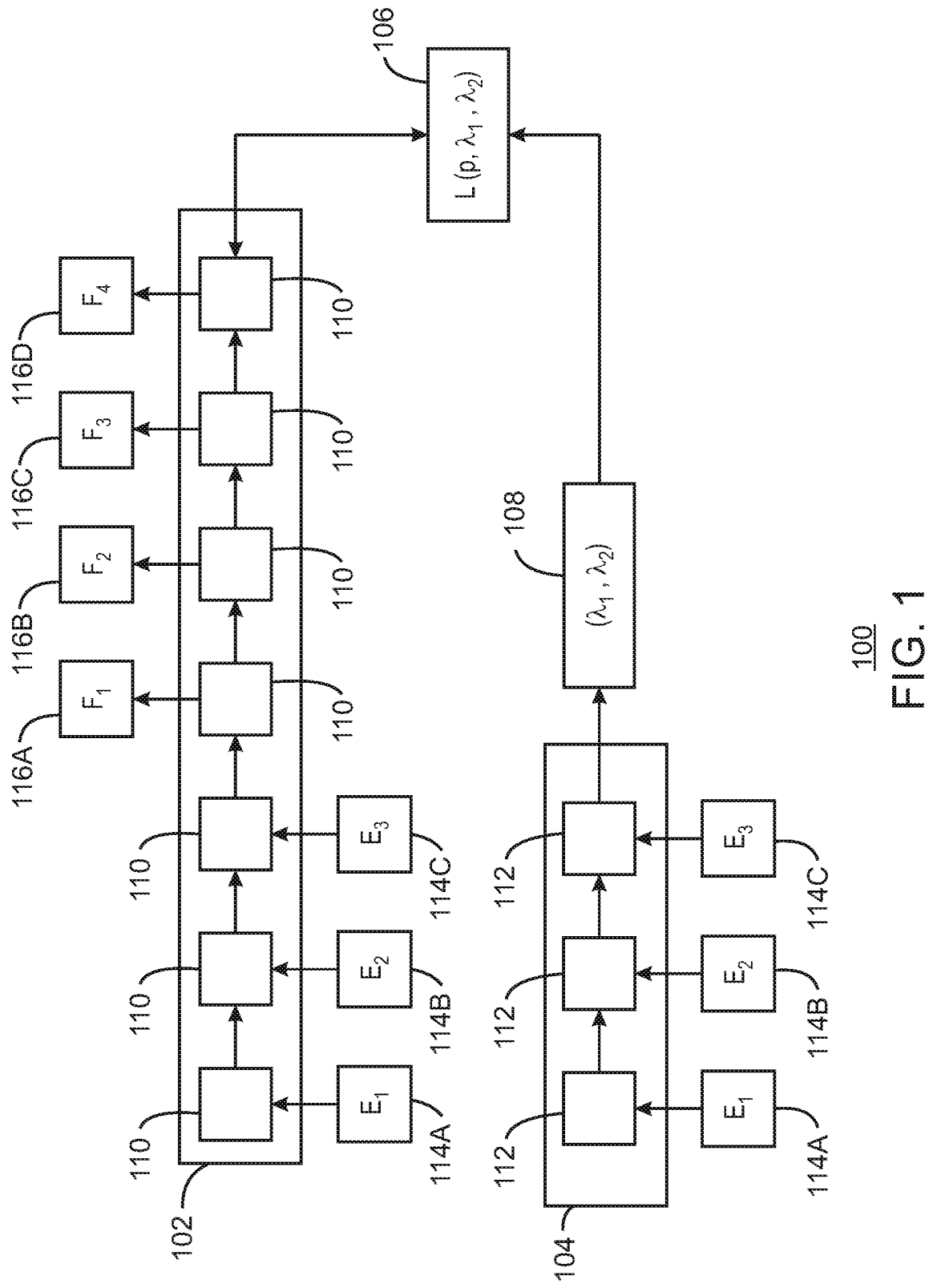
FIG. 1 is a block diagram of an example minimax neural network that can train a primal network to perform multi-objective tasks.

With reference now to FIG. 1, a block diagram shows an example minimax neural network that can train a primal network to perform multi-objective tasks. The example minimax neural network 100. FIG. 1 includes a primal network 102 and a dual network 104. The primal network 102 and the dual network 104 are communicatively coupled to a Lagrangian function 106. The dual network 104 is shown outputting a pair of Lagrangian multipliers 108. The primal network 102 includes LSTM cells 110. The dual network 104 includes LSTM cells 112. The primal network is shown receiving values 114A, 114B, 114C and outputting values 116A-116D. The dual network is shown receiving values 114A, 114B, and 114C.

In the example of FIG. 1, the primal network 102 and the dual network 104 are alternately trained against each other using the Lagrangian function 106. For example, the primal network 102 may be trained to minimize the Lagrangian function 106 while the dual network 104 is held constant. Similarly, the dual network 104 may be trained to maximize the Lagrangian function while the primal network 102 is held constant. Thus, alternating iterations of gradient descent with respect to the policy and gradient ascent with respect to the Lagrange multipliers may be performed.

In the example of FIG. 1, the primal network 102 is generative. Thus, given an input utterance including words represented by values 114A, 114B, and 114C, the primal network 102 generates an output response of words represented by values 116A-116D. Given the same input utterance represented by values 114A, 114B, and 114C, the dual network 104 outputs Lagrange multipliers 108 that are part of the Lagrangian 106.

In particular, a decision making problem may be a Markov Decision process (MDP) with finite state and action spaces. In general, a finite MDP may be expressed as a tuple $(X, A, R, D, \mathbb{P}, \mathbb{P}_0)$ where $X=\{1, \ldots, n, x_{Ter}\}$ and $A=\{1, \ldots, m\}$ are the state and action spaces, respectively, and $x_{Ter}$ is a recurrent terminal state. For a state x and an action a, $R(x, a)$ may be a bounded reward function, and $D_1(x, a), \ldots, D_n(x, a)$ the constraints cost function. $\mathbb{P}(\cdot|x, a)$ may be the transition probability distribution, and $P_0(.)$ to be the initial state distribution. A stationary policy $\mu(.|x)$ for an MDP is a probability distribution over actions, conditioned on the current state. In policy gradient methods, such policies can be parameterized by a k-dimensional vector $\theta$, using this notation we can write the space of policies as $\mu(.|x; \theta)$, $x \in X$, $\theta \in \mathbb{R}^k$. Since in this setting a policy $\mu$ is uniquely defined by its parameter vector $\theta$, policy-dependent functions can be written as a function of $\mu$ or $\theta$, and we use $\mu(.|x; \theta)$ to denote the policy and $\theta$ to denote the dependency on the policy (parameter). With multi-objective MDPs, an optimization may be expressed using the following equation:

$$\underset{\theta}{\text{maximize }} V^\theta(x_0) \text{ subject to } D_1^\theta(x_0) \leq \gamma_1 \ldots D_n^\theta(x_0) \leq \gamma_n \quad \text{Eq. 1}$$

where $\gamma_1 \ldots \gamma_n$ are user-defined thresholds. To solve the problem above, Eq. 1 may be transformed using a Lagrangian relaxation procedure. The result is an unconstrained problem in the form of the Lagrangian function, also referred to herein as the Lagrangian:

$$L(\theta, \lambda) = \underset{\theta}{\min}\underset{\lambda}{\max} - V^\theta(x_0) + \sum_{i=1}^{n} \lambda_i (D_i^\theta(x_0) - \gamma_i) \quad \text{Eq. 2}$$

where $\lambda_i$ are Lagrange multipliers. In order to achieve a multi-objective goal, a primal network may be trained to converge to the minimax policy. In particular, alternating policy gradient updates, such as gradient decent with respect to the policy and gradient ascent with respect to the lambda multiplier, can be used to converge to the optimal policy. In addition, the Lagrangian variables may be conditioned on the state space. In other words, the dual variable may be treated as a different data dependent model parameterized using the parameter $\zeta$ where $\zeta \in \mathbb{R}$ as shown in Eq. 4 below:

$$L(\theta, \lambda) = \underset{\theta}{\min}\underset{\lambda}{\max} - V^\theta(x_0) + \sum_{i=1}^{n} \lambda_i (D^\theta(x_0) - \gamma_i) \quad \text{Eq. 3}$$

$$L(\theta, \lambda) = \underset{\theta}{\min}\underset{\zeta}{\max} - V^\theta(x_0) + \sum_{i=1}^{n} \lambda_i^\zeta (D^\theta(x_0) - \gamma_i) \quad \text{Eq. 4}$$

The equality of Equations 3 and 4 follows from an enlarged search space and including the case in which the Lambda variables are constant.

Using the above formulation in Eq. 4, two policies are modeled simultaneously using two different networks, the primal network 102 and the dual network 104, as can be seen in FIG. 1. In particular, the primal network 102 and the dual network 104 of FIG. 1 may be modeled as two LSTM models with different parameters for use with chat bots or any other generative task. The objective function of the networks is the Lagrangian where the primal network 102 is configured to find a policy that minimizes Lagrangian function while the dual network is configured to find a policy that maximizes the Lagrangian function.

Any number of multiple objectives may thus be represented by the Lagrangian multipliers and incorporated into training of the primal network. In the particular generative task of generating responses, some reward functions that may be incorporated can include a redundancy unlikelihood objective, a semantic dissimilarity objective, and a semantic coherence objective. The redundancy unlikelihood objective may improve ease of answering in dialogues. For example, one of the desired properties for having a good generated dialogue may be that in each turn the semi-automated or automated agent will generate a response that the other party will find it easy to respond. Training an ordinary Seq2Seq model may result in giving high probability of redundant answers like "I don't know what you are talking about," "I have no idea," etc. Although these answers may be appropriate in terms of perplexity of the language model and are suitable for a wide range of questions, it will be hard to continue the dialogue after receiving such a response. Therefore, a forward-looking function may be used to measure the ease of answering a generated turn by the agent. In some examples, this may be done using the negative log likelihood of responding to that utterance with a redundant response. To construct this function several redundant responses may be made available a-priori so a set S of such responses can be manually constructed that may occur very frequently in SEQ2SEQ models of conversations. Although it may be very difficult if not impossible to manually find all such responses, it may be assumed that similar responses will be embedded closely to the responses on S. A system less likely to generate utterances in the list is thus also less likely to generate other dull responses. A redundancy unlikelihood objective may be calculated using the equation:

$$R1 = -\frac{1}{N_S} \sum_{s \in S} \frac{1}{N_s} \log \mathbb{P}_{seq2seq}(s|a) \quad \text{Eq. 5}$$

where $N_S$ denotes the cardinality of S and $N_s$ denotes the number of tokens in the response s and $\mathbb{P}_{seq2seq}$ is the probability of the language model.

In some examples, a semantic dissimilarity objective can be used to improve information flow. For example, another desired property of conversational agents may be that in each turn, new information will be added to the dialogue. In order to generate a long dialogue, each agent must provide new information at each turn. In other words, the dialogue should flow and repetitive sequences should be avoided. Therefore, in some examples, semantic similarity between consecutive turns from the same agent can be penalized. Formally, given $e_{p_i}$, $e_{p_{i+1}}$ as the embedded representations obtained from the encoder for two consecutive turns pi and pi+1, the reward can be calculated by the negative log of the cosine similarity between them, as shown in the equation:

$$R2 = -\log\cos\frac{(e_{p_i}, e_{p_{i+1}})}{\|e_{p_i}\|\|e_{p_{i+1}}\|} \quad \text{Eq. 6}$$

where (.,.) is the Euclidean inner-product and is the Euclidean norm.

In some examples, a semantic coherence objective can be included in training to improve semantic coherence. In addition to the previous rewards, another objective may be to make sure that the generated responses are indeed coherent and relate to the topic of the conversation and more precisely to the topic of the previous turns of conversation. This type of requirement can be measured using the mutual information between the action a and previous historical turns to ensure the generated responses are coherent and appropriate using the equation:

$$R3 = \frac{1}{N_a}\log \mathbb{P}_{seq2seq}(a \mid q_i, p_i) + \frac{1}{N_{qi}}\log \mathbb{P}^{backward}_{seq2seq}(q_i \mid a) \qquad \text{Eq. 7}$$

where as $\mathbb{P}_{seq2seq}$ $(a|q_i,p_i)$ denotes the probability of generating response given the previous dialogue utterances $[p_i,q_i]$, and $\mathbb{P}^{backward}_{seq2seq}$ $(q_i|a)$ denotes the backward probability of generating the previous dialogue utterance qi based on response a. In order to train this model, the same seq2seq (an LSTM model with attention) can be trained with sources and targets swapped. This reward can be divided by the length of the utterance in order to scale the loss.

In order to incorporate all of those rewards together, one of the rewards can be chosen to be a primary loss bound by the other objectives by thresholds. Thus, the problem can be converted into a multi-objective one, using the equation:

$$\underset{\theta}{\text{maximize }} R_1^\theta(x_0) \text{ subject to} -R_2^\theta(x_0) \leq \gamma_1, -R_3^\theta(x_0) \leq \gamma_2 \qquad \text{Eq. 8}$$

It is to be understood that the block diagram of FIG. 1 is not intended to indicate that the minimax neural network 100 is to include all of the components shown in FIG. 1. Rather, the minimax neural network 100 can include fewer or additional components not illustrated in FIG. 1 (e.g., additional inputs, outputs, models, neural networks, cells, Lagrangian multipliers, etc.).

Figure 2:
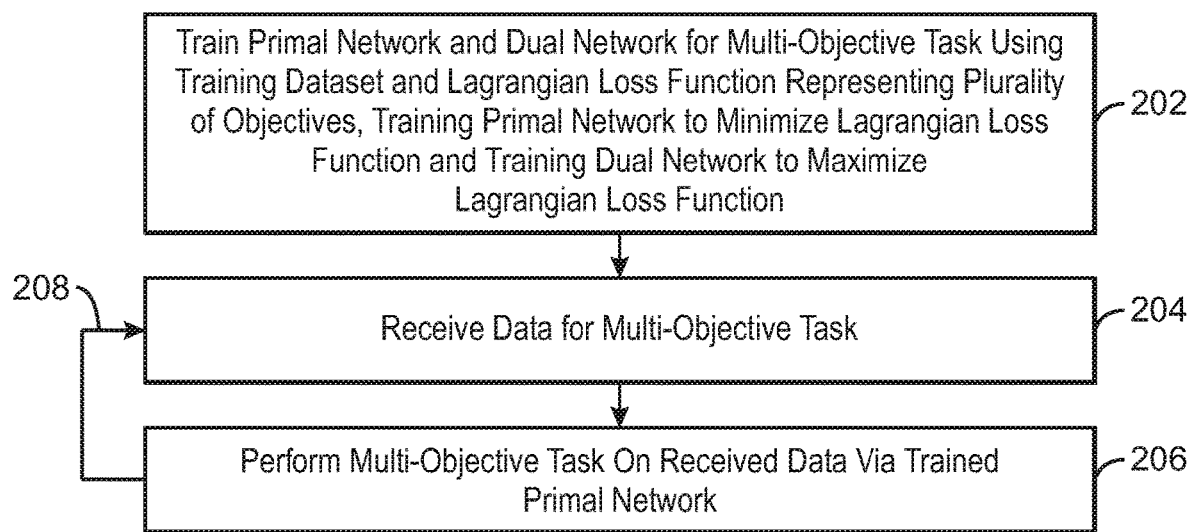
FIG. 2 is a process flow diagram of an example method that can perform multi-objective tasks using trained primal networks.

FIG. 2 is a process flow diagram of an example method that can perform multi-objective tasks using trained primal networks. The method 200 can be implemented with any suitable computing device, such as the computing device 800 of FIG. 8. For example, the method 200 can be implemented using the processor 802 of the computing device 800 of FIG. 8, or using the processor 1202 and computer readable medium 1200 of FIG. 12.

At block 202, a primal network and a dual network of a minimax neural network are trained for a multi-objective task using a Lagrangian loss function representing a plurality of objectives. The primal network is trained to minimize the Lagrangian loss function and the dual network is trained to maximize the Lagrangian loss function. In some examples, the multi-objective task is a Markov Decision process comprising a finite state space and a finite action space. In various examples, the primal network is pretrained using a general policy learned from another setting or randomly initializing the primal network during training. In some examples, the dual network is randomly initialized during training. In some examples, gradients for the primal network and the dual network are estimated based on a likelihood ratio. In various examples, policy gradients of the primal network and the dual network are alternately updated based on different step sizes for the primal network and the dual network. In some examples, the primal network and the dual network are alternatively trained using a pre-existing dataset, a simulator, a feedback from an environment, or any combination thereof. For example, the minimax neural network can be trained using the method 400 of FIG. 4.

At block 204, data for the multi-objective task is received. For example, the data may include words from input text and a prefix of conversation in the case of automated response generation.

At block 206, a multi-objective task is performed on the received data via the trained primal network. For example, the multi-objective task may be automated response generation, selection, classification, or any other multi-objective task that can be performed using neural networks.

As indicated by arrow 208, in some examples, additional data can be received for the multi-objective task and additional multi-objective tasks performed based on the additional data. For example, the additional data may be additional input text and additional prefixes of conversation.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
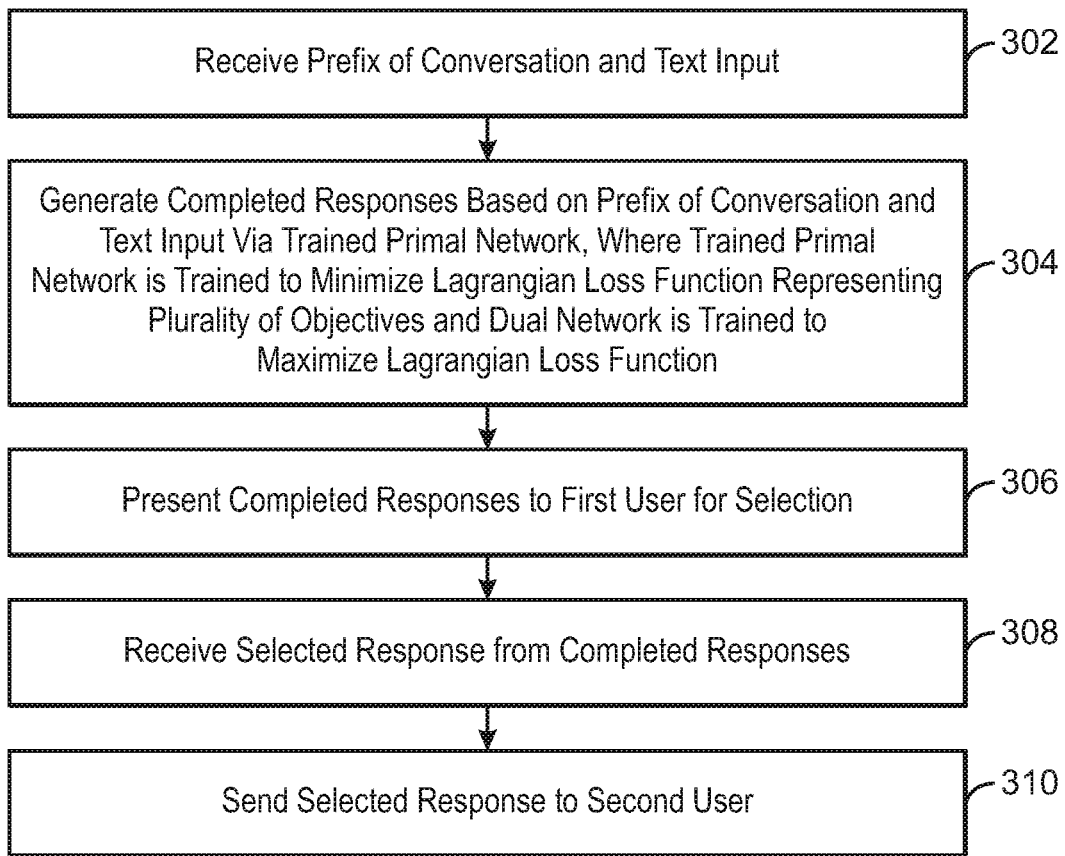
FIG. 3 is a process flow diagram of an example method that can perform automated response generation using trained primal networks.

FIG. 3 is a process flow diagram of an example method that can perform automated response generation using trained primal networks. The method 300 can be implemented with any suitable computing device, such as the computing device 900 of FIG. 9. For example, the method 300 can be implemented using the processor 802 of the computing device 900 of FIG. 9, or using the processor 1302 and computer readable medium 1300 of FIG. 13.

At block 302, a prefix of conversation and a text input is received. For example, the prefix of conversation may include one or more turns of dialogue between a first user and a second user. The text input includes one or more words input by the first user in response to an inquiry from the second user.

At block 304, a completed response is generated based on the prefix of conversation and the text input via a trained primal network. The trained primal network is trained to minimize a Lagrangian loss function representing a plurality of objectives. A dual network is trained to maximize the Lagrangian loss function. For example, the primal network and the dual network can be alternately trained to minimize and maximize the Lagrangian loss function. In various examples, the primal network is trained using a first limit of turns of conversation and gradually increasing the limit to a second limit of turns of conversation. In some examples, the primal network is trained using sequences with lower likelihood of generating redundant responses among all sequences in a training dataset. In some examples, a plurality of completed responses can be generated. In some examples, the completed response can be iteratively built beginning with the text input word by word. In some examples, beam searching is used to generate a number of completed responses.

At block 306, completed responses including the completed response are presented to a first user for selection. For example, the completed responses may be displayed as a list as shown in FIGS. 7A and 7B.

At block 308, a selected response from the completed responses is received. For example, the user may select a response by clicking on the response or scrolling down and selecting a response from a list of responses, or by adding the completed response word-by-word.

At block 310, the selected response is sent to a second user. For example, the selected response may be sent to the second user as if the first user typed the response out and sent the response. The selected response may thus be sent via the communication tool or application. In some examples, additional inquiries may be received from the second user and the method may begin again at block 302.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the method 300 can be repeated for additional received prefixes of conversation and text inputs. In some examples, the method 300 can include sending the completed response as a response to an inquiry in response to detecting that a confidence score of the completed response exceeds a threshold score.

Figure 4:
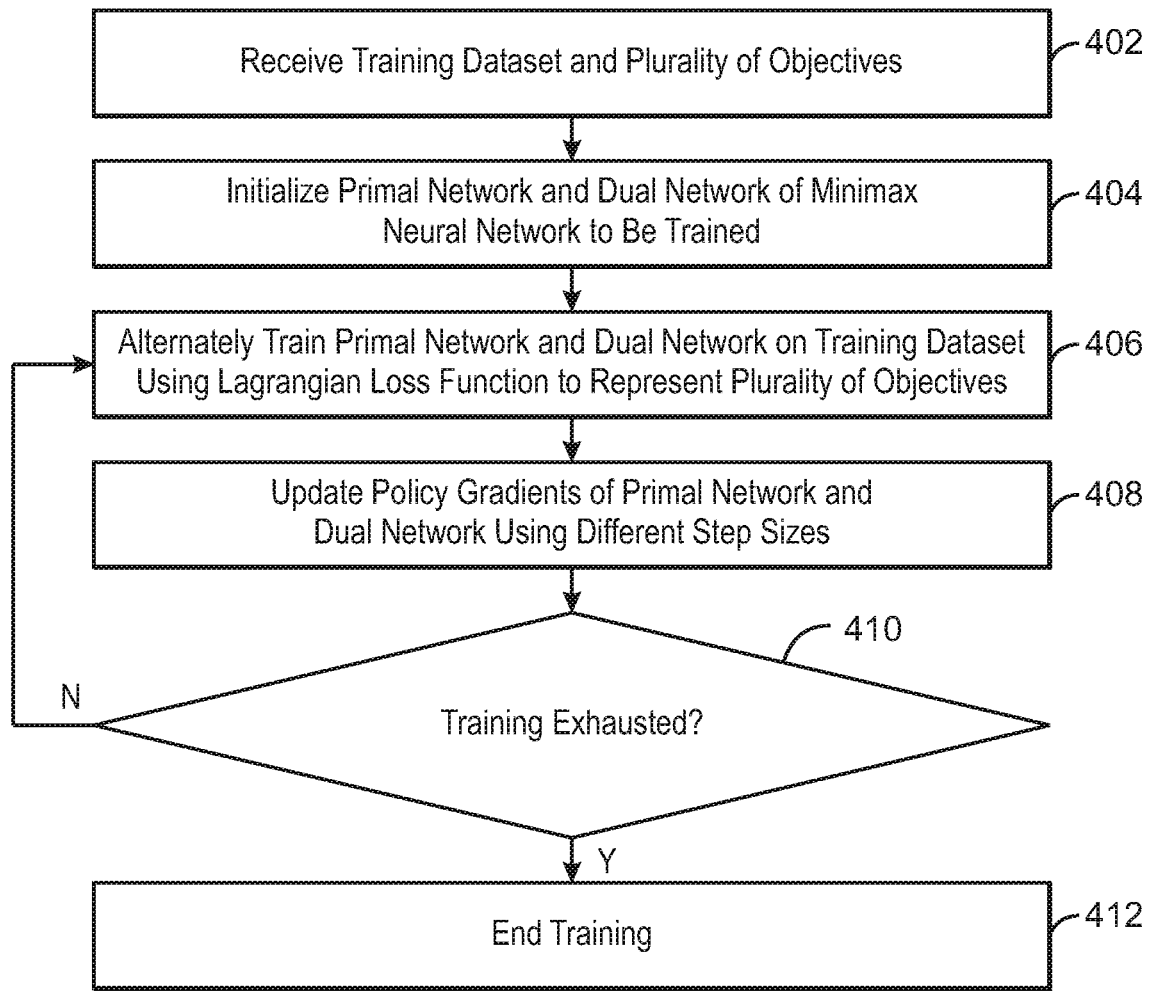
FIG. 4 is a process flow diagram of an example method for training primal networks to perform multi-objective tasks.

FIG. 4 is a process flow diagram of an example method for training primal networks to perform multi-objective tasks. The method 400 can be implemented with any suitable computing device, such as the computing device 800 of FIG. 8. For example, the method 400 can be implemented using the processor 802 of the computing device 800 of FIG. 8, or using the processor 1202 and computer readable medium 1200 of FIG. 12.

At block 402, a training dataset and a plurality of objectives are received. The training dataset may include data depending on the specific multi-objective task to be performed. For example, the dataset for a generative text task may include conversations as discussed with respect to FIG. 5. The objectives may include relevance, risk reduction, reduced redundancy, reduced semantic similarity, and semantic coherence, among other possible objectives. In some examples, the objectives may be received in the form of loss functions.

At block 404, a primal network and a dual network of a minimax neural network to be trained are initialized. For example, the primal network can be pretrained using a general response policy learned from a fully supervised setting, or randomly initialized. The dual network can be randomly initialized.

At block 406, the primal network and the dual network are alternately trained using a Lagrangian loss function representing the plurality of objectives. In some examples, the multi-objective task can be a Markov Decision process including a finite state space and a finite action space. The primal network can be trained to minimize the Lagrangian loss function and the dual network can be alternately trained to maximize the Lagrangian loss function.

At block 408, policy gradients of the primal network and the dual network are updated based on different step sizes for the primal network and the dual network. In some examples, the gradients for the primal network and the dual network are estimated based on a likelihood ratio estimator.

At decision diamond 410, a determination is made as to whether the training is exhausted. For example, a preset condition on the validation split may be set in advance of training, or a manual inspection of some measures is performed.

At block 412, the training ends. The primal network may then be used for performing multi-objective tasks on received data (as in FIG. 2).

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, additional decision diamonds or conditions, or even manual inspection of various metrics that are measured during training, may be included in method 400.

FIG. 5 is a process flow diagram of an example method for training primal networks to perform automated response generation. The method 500 can be implemented with any suitable computing device, such as the computing device 900 of FIG. 9. For example, the method 500 can be implemented using the processor 802 of the computing device 900 of FIG. 9, or using the processor 1302 and computer readable medium 1300 of FIG. 13.

At block 502, a training dataset and plurality of objectives are received. For example, the training dataset may be the OpenSubtitles dataset of movie conversations. The OpenSubtitles dataset contains sentences uttered by characters in movies. For example, in this dataset, each utterance can be treated as a response to the previous utterance and as a context for the next response. The training and validation split may therefore include 62 million sentences (923 million tokens) as training examples, and the test set may have 26 million sentences (395 million tokens). The split is done in such a way that each sentence in a pair of sentences either appear together in the training set or test set but not both. Given the broad scope of movies, this is an open-domain conversation dataset. Each turn in the dataset may be treated as a target and the concatenation of two previous sentences as source inputs.

At block 504, a primal network is pretrained based on a preselected model and a dual net is randomly initialized. For example, the primal network may be initialized with a sequence-to-sequence (Seq2Seq) language model. In some examples, the reinforcement learning (RL) system is initialized using a general response generation policy which is learned from a fully supervised setting. The model chosen for pretraining may be a simple one and can be replaced with any other model. The generated sentences can be viewed as actions that are taken according to the policy defined by the Seq2Seq language model. The policy may be defined by a probability distribution over the actions given the state which is $\mathbb{P}(.|p_i,q_i)$. In some examples, this probability distribution is modeled using a Seq2Seq LSTM model. In some examples, the LSTM model can be replaced with any other suitable another language generating model.

An action may therefore be the generated utterance. Since the training of method 500 includes dialogue, the state space may include information about the past turns of the conversation. For example, a state may include the previous two dialogue turns $[p_i, q_i]$. The vector representation of a state is thus encoded by a concatenation of the previously generated response pi and the response from the second agent $q_i$.

At block 506, a primal network and a dual network of a minimax neural network are alternately trained on the training dataset using a Lagrangian loss function to represent the plurality of objectives. In some examples, the minimax neural network is trained using an initial limit of two turns of conversation and the limit is gradually increased to five turns of conversation. In some examples, the minimax neural network is trained using a predetermined number of sequences comprising sequences with a lower likelihood of generating redundant responses than other sequences in a training dataset. In some examples, as another helpful step for the dialogue simulation, a subset of 10 million messages from the OpenSubtitles dataset may be retrieved and 0.8 million sequences extracted with the lowest likelihood of generating the redundant responses from the set to ensure initial inputs are easy to respond to.

At block 508, policy gradients of primal network and dual net are alternately updated based on different step sizes. For example, a different time scales method may be used to alternately update the policy gradients. Since the minimax network training includes two different (alternating) gradient policy updates, each one of the primal network and the dual network will have a different step size. For example, the step size of the primal network may be a different order of magnitude than the step size of the dual network during training. Therefore, the primal network will receive higher rate of convergence, whereas the dual net will receive a smaller step size and thus will converge slower. In some examples, in order to estimate the gradients for the policies, a likelihood ratio estimator is used. The likelihood ratio estimator can estimate gradients based on statistical theory. For example, the likelihood ratio estimator can use the REINFORCE trick, released in 1992.

At decision diamond 510, a determination is made as to whether the training is exhausted. For example, a preset number of training iterations may be set in advance of training.

At block 512, the training ends. The primal network may then be used for generating automated responses to received inquiries, as described in FIG. 3 above.

The process flow diagram of FIG. 5 is not intended to indicate that the operations of the method 500 are to be executed in any particular order, or that all of the operations of the method 500 are to be included in every case. Additionally, the method 500 can include any suitable number of additional operations. For example, additional decision diamonds or conditions, or even manual inspection of various metrics that are measured during training, may be included in method 500.

FIG. 6 is an example primal neural network including three long short-term memory (LSTM) cells. The example neural network 600 can be trained using method 500 and using to generate completed responses in method 300 and computing device 900 of FIG. 9. For example, the neural network 600 may be a sequence-to-sequence deep-learning architecture with or without an attention mechanism. FIG. 6 includes three LSTM cells 602, 604, and 606. The first LSTM cell 602 includes words 608A, 608B, 608C, and 608D corresponding to a client's inquiry. The second LSTM cell 604 includes text input 610A and 610B corresponding to text input from a human agent. The third LSTM cell 606 includes words 612A, 612B, 612C, and 612D corresponding to a completion portion of a completed response.

As shown in FIG. 6, the first LSTM 602 receives a client's inquiry word-by-word, or a complete prefix of a conversation, and encodes the words as a fixed-length hidden-state vector hA. The second LSTM 604 receives text input from a human agent, and transforms vector hA into a hidden-state vector hB by encoding the text input word-by-word. The third LSTM 606 transforms (decodes) vector hB into a sequence of output words 612A-612D, which is the completion of the completed response. The completed response can be generated by concatenating the text input 610A, 610B with the completion 612A-612D. In some examples, instead of generating one completed answer, the neural network 600 can extract several completed responses. For example, the several completed responses can be extracted using beam search.

In the training phase, all historical conversations are transformed into training triples comprised of a client's inquiry, a beginning of the corresponding human agent's response, and the end of the agent's response. The human agent's response is divided into all combinations of beginning and end. The response may be partitioned at each word to generate a different training example. The neural network 600 may be trained using multiple objectives via a Lagrangian loss function that incorporates all the objectives. For example, the objectives used during training may include word-by-word probabilities, perplexity of the end of the agent's response, and relevance, among other objectives described herein.

FIG. 7A is a diagram of an example chat display including a generated set of completed responses. The example chat display 700A can be generated using the computing device 900 of FIG. 9 using the methods 300 and 500 of FIGS. 3 and 5.

In FIG. 7A, a chat display 700A of a human customer-service agent over a communication channel is shown. A first message 702 in FIG. 7A is by the automatically generated for the company. The second message 704 is received from a customer. To the bottom of the screen, above a horizontal line, a human agent is typing his response. In plain text, we see the agent's text input 706A "I'll be happy". Below the text input 706A, three suggestions 708A, 708B, and 708C for the agent on how to complete the response are displayed. For example, the suggestions 708A, 708B, and 708C may be generated using the techniques described herein. The selected suggestion 708A appears also above the line in continuance to the text input in selected text. As can be seen in the example chat display 700A, the three automated suggestions 708A, 708B, and 708C may be based both on the conversation context, including first message 702 and second message 704, as well as the agent's text input 706A.

FIG. 7B is a diagram of an example chat display including a generated updated set of completed responses. The example chat display 700A can be generated using the computing device 900 of FIG. 9 using the methods 300 and 500 of FIGS. 3 and 5.

In FIG. 7B, as the agent continues typing, a new set of suggested responses 708D, 708E, 708F are displayed below the updated text input 706B in the updated chat display 700B. Thus, new suggested responses may be generated in real-time as the agent types. For example, a new set of suggested responses may be generated each time the agent inputs an additional word into the text input 706B. If one of the suggested responses, such as selected response 708E, is correct, then the agent can select the response and the response 708E will be sent to the user.

Thus, given a prefix of a conversation containing zero or more text messages between a human agent and a customer, and given an initial text input by the agent corresponding to a partial response, the application may suggest one or more completed responses. The completion may correspond to the specific text input, as well as the ongoing conversation. In some examples, other types of data and metadata in addition to text may be included as part of the conversation prefix, text input, or even the completed responses. For example, metadata can include images, video, web links, etc. In some examples, the completed responses may be automatically learned from historical conversations. For example, the historical conversations can be used as training data to train a neural network used to generate the completed responses. Similarly, historical conversations can also be used to train neural networks to create end-to-end solutions, such as chat bots. The application may continue to improve with each new conversation as the neural network may be trained on the additional conversations. In some examples, in those parts of a conversation where a response is identified with high confidence even before the agent types a single word, completed responses may be fully automated with no human intervention. Thus, time can be saved by using the suggested responses or automatically sending high confidence responses instead of completely typing them out. Moreover, the quality of responses can be improved by removing the chances of typos and other errors.

FIG. 8 is block diagram of an example computing device that can perform multi-objective tasks using a primal network trained using a minimax neural network architecture. The computing device 800 may be for example, a server, desktop computer, laptop computer, tablet computer, or smartphone. In some examples, computing device 800 may be a cloud computing node. Computing device 800 may be described in the general context of computer system executable instructions, such as program modules, being executed by a computer system. Generally, program modules may include routines, programs, objects, components, logic, data structures, and so on that perform particular tasks or implement particular abstract data types. Computing device 800 may be practiced in distributed cloud computing environments where tasks are performed by remote processing devices that are linked through a communications network. In a distributed cloud computing environment, program modules may be located in both local and remote computer system storage media including memory storage devices.

The computing device 800 may include a processor 802 that is to execute stored instructions, a memory device 804 to provide temporary memory space for operations of said instructions during operation. The processor can be a single-core processor, multi-core processor, computing cluster, or any number of other configurations. The memory 804 can include random access memory (RAM), read only memory, flash memory, or any other suitable memory systems.

The processor 802 may be connected through a system interconnect 806 (e.g., PCI®, PCI-Express®, etc.) to an input/output (I/O) device interface 808 adapted to connect the computing device 800 to one or more I/O devices 810. The I/O devices 810 may include, for example, a keyboard and a pointing device, wherein the pointing device may include a touchpad or a touchscreen, among others. The I/O devices 810 may be built-in components of the computing device 800, or may be devices that are externally connected to the computing device 800.

The processor 802 may also be linked through the system interconnect 806 to a display interface 812 adapted to connect the computing device 800 to a display device 814. The display device 814 may include a display screen that is a built-in component of the computing device 800. The display device 814 may also include a computer monitor, television, or projector, among others, that is externally connected to the computing device 800. In addition, a network interface controller (NIC) 816 may be adapted to connect the computing device 800 through the system interconnect 806 to the network 818. In some embodiments, the NIC 816 can transmit data using any suitable interface or protocol, such as the internet small computer system interface, among others. The network 818 may be a cellular network, a radio network, a wide area network (WAN), a local area network (LAN), or the Internet, among others. An external computing device 820 may connect to the computing device 800 through the network 818. In some examples, external computing device 820 may be an external web-server 820. In some examples, external computing device 820 may be a cloud computing node.

The processor 802 may also be linked through the system interconnect 806 to a storage device 822 that can include a hard drive, an optical drive, a USB flash drive, an array of drives, or any combinations thereof. In some examples, the storage device may include a receiver 824, primal network 826, and a training network 828. The receiver 824 can receive data for a multi-objective task. For example, a number of objectives may also be received in the form of loss functions. The objective task may be selection task, a classification task, or a generation task, among other possible tasks. For example, the multi-objective task can include a selection, a classification, a regression, a recommendation, a generation, or any other type of prediction task. The primal network 826 can be trained to perform the multi-objective task on the received data via the training network 828. For example, the training network 828 may be a minimax neural network. For example, the training network 828 can include the primal network and a dual network. The training network 828 can train the primal network and the dual network for a multi-objective task using a Lagrangian loss function representing the number of objectives. The training network 828 trains the primal network to minimize the Lagrangian loss function and the dual network to maximize the Lagrangian loss function. In some examples, the multi-objective task is a Markov Decision process including a finite state space and a finite action space. In some examples, the training network 828 pretrains the primal network using a general policy learned from another setting or a random initialization. The training network 828 can randomly initialize the dual network during training. In some examples, the primal network has a step size that is smaller than a step size of the dual network during training. For example, the step size of the primal network may be an order or more of magnitude smaller than the step size of the dual network. In some examples, the training network 828 can estimate gradients based on a likelihood ratio estimate. For example, the training network 828 can train the primal network using the method 400 of FIG. 4.

It is to be understood that the block diagram of FIG. 8 is not intended to indicate that the computing device 800 is to include all of the components shown in FIG. 8. Rather, the computing device 800 can include fewer or additional components not illustrated in FIG. 8 (e.g., additional memory components, embedded controllers, modules, additional network interfaces, etc.). Furthermore, any of the functionalities of the receiver 824, the primal network 826, and the training network 828 may be partially, or entirely, implemented in hardware and/or in the processor 802. For example, the functionality may be implemented with an application specific integrated circuit, logic implemented in an embedded controller, or in logic implemented in the processor 802, among others. In some embodiments, the functionalities of the receiver 824, primal network 826, and training network 828 can be implemented with logic, wherein the logic, as referred to herein, can include any suitable hardware (e.g., a processor, among others), software (e.g., an application, among others), firmware, or any suitable combination of hardware, software, and firmware.

FIG. 9 is a block diagram of an example computing device that can perform automated response generation using a primal network trained using a minimax neural network architecture. The computing device 900 of FIG. 9 includes similarly numbered elements of FIG. 8. In addition, the computing device 900 includes a response displayer 902 and a response sender 904.

In the example computing device 900, the receiver 824 can receive a prefix of conversation and a text input. For example, the prefix of conversation can include dialogue between a first user and a second user, and the text input can include a portion of a completed response. The primal network 826 be trained to generate a completed response based on the prefix of conversation and the text input via a training network 828 and using a preexisting dataset. For example, the training network 828 may be a minimax neural network. For example, the training network 828 may include the primal network and a dual network trained using a Lagrangian loss function representing a plurality of objectives. The plurality of objectives can include a perplexity objective, a relevance objective, a redundancy unlikelihood objective, a semantic dissimilarity objective, a semantic coherence objective, among other objectives, or any combination thereof. In some examples, the primal network and the dual network are long short-term memory (LSTM) models with different parameters. In some examples, the trained primal network 826 can be trained to minimize the Lagrangian loss function by generating completed responses. The dual network is trained to maximize the Lagrangian loss function. The response displayer 902 can display completed responses generated by the primal network 826. For example, the response displayer 902 can present the plurality of completed responses including the completed response to a user for selection. For example, the completed responses may be displayed as a list in an application, such as in FIGS. 7A and 7B. The response sender 904 can receive a selected response from the completed responses and send the selected response to a second user.

Referring now to FIG. 10, illustrative cloud computing environment 1000 is depicted. As shown, cloud computing environment 1000 comprises one or more cloud computing nodes 1002 with which local computing devices used by cloud consumers, such as, for example, personal digital assistant (PDA) or cellular telephone 1004A, desktop computer 1004B, laptop computer 1004C, and/or automobile computer system 1004N may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004A-N shown in FIG. 10 are intended to be illustrative only and that computing nodes 1002 and cloud computing environment 1000 can communicate with any type of computerized device over any type of network and/or network addressable connection (e.g., using a web browser).

Referring now to FIG. 11, a set of functional abstraction layers provided by cloud computing environment 1000 (FIG. 10) is shown. It should be understood in advance that the components, layers, and functions shown in FIG. 11 are intended to be illustrative only and embodiments of the invention are not limited thereto. As depicted, the following layers and corresponding functions are provided.

Hardware and software layer 1100 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1102 provides an abstraction layer from which the following examples of virtual entities may be provided: virtual servers; virtual storage; virtual networks, including virtual private networks; virtual applications and operating systems; and virtual clients. In one example, management layer 1104 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1106 provides examples of functionality for which the cloud computing environment may be utilized. Examples of workloads and functions which may be provided from this layer include: mapping and navigation; software development and lifecycle management; virtual classroom education delivery; data analytics processing; transaction processing; and multi-objective task processing.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Referring now to FIG. 12, a block diagram is depicted of an example tangible, non-transitory computer-readable medium 1200 that can train a primal network to perform multi-objective tasks. The tangible, non-transitory, computer-readable medium 1200 may be accessed by a processor 1202 over a computer interconnect 1204. Furthermore, the tangible, non-transitory, computer-readable medium 1200 may include code to direct the processor 1202 to perform the operations of the methods 200 and 400 of FIGS. 2 and 4.

The various software components discussed herein may be stored on the tangible, non-transitory, computer-readable medium 1200, as indicated in FIG. 12. For example, a network training module 1206 includes code to train a primal network and a dual network for a multi-objective task using a Lagrangian loss function representing a plurality of objectives. The network training module 1206 also includes code to train the primal network to minimize the Lagrangian loss function and to train the dual network to maximize the Lagrangian loss function. The network training module 1206 can also include code to process the multi-objective task as a Markov Decision process including a finite state space and a finite action space. In various examples, the network training module 1206 includes code to alternately train the primal network and the dual network using a pre-existing dataset, a simulator, a feedback from an environment, or any combination thereof. In some examples, the network training module 1206 includes code to pretrain the primal network using a general policy learned from another setting or by randomly initializing the primal network during training. In various examples, the network training module 1206 includes code to randomly initialize the dual network during training. In some examples, the network training module 1206 includes code to estimate gradients for the primal network and the dual network based on a likelihood ratio. In some examples, the network training module 1206 includes code to update policy gradients of the primal network and the dual network based on different step sizes for the primal network and the dual network. A receiver module 1208 includes code to receive data for a multi-objective task including the plurality of objectives. A primal neural network module 1210 includes code to perform a multi-objective task including the plurality of objectives on the received data via the trained primal network. It is to be understood that any number of additional software components not shown in FIG. 12 may be included within the tangible, non-transitory, computer-readable medium 1200, depending on the particular application.

Referring now to FIG. 13, a block diagram is depicted of an example tangible, non-transitory computer-readable medium 1300 that can train a primal network to perform automated response generation. The tangible, non-transitory, computer-readable medium 1300 may be accessed by a processor 1302 over a computer interconnect 1304. Furthermore, the tangible, non-transitory, computer-readable medium 1300 may include code to direct the processor 1302 to perform the operations of the methods 300 and 500 of FIGS. 3 and 5 above.

The various software components discussed herein may be stored on the tangible, non-transitory, computer-readable medium 1300, as indicated in FIG. 13. For example, a network training module 1306 includes code to train a primal network to minimize a Lagrangian loss function representing a plurality of objectives and train a dual network to maximize the Lagrangian loss function. The network training module 1306 can also include code to train the minimax neural network using a first limit of turns of conversation and gradually increase the limit to a second limit of turns of conversation. As one example, the first limit can be two turns of conversation and the second limit can be five turns of conversation. A receiver module 1308 includes code to receive a prefix of conversation and a text input. A primal neural network module 1310 includes code to generate a completed response based on the prefix of conversation and the text input. For example, the primal neural network module 1310 can include code to iteratively build a sentence beginning with the text input word by word. The primal neural network module 1310 also includes code to generate a plurality of completed responses. For example, the primal neural network module 1310 can include code to generate a plurality of completed responses including the completed response using beam searching. A response displayer module 1312 includes code to present the plurality of completed responses including the completed response to a user for selection. A response sender module 1314 includes codes to receive a selected response from the completed responses and send the selected response to a second user. The response sender module 1314 can include code to automatically send the completed response as a response to an inquiry in response to detecting that a confidence score of the completed response exceeds a threshold score. It is to be understood that any number of additional software components not shown in FIG. 13 may be included within the tangible, non-transitory, computer-readable medium 1300, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIGS. 12 and 13 may be included within the tangible, non-transitory, computer-readable media 1200 and 1300, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
receive data comprising text input corresponding to a conversation comprising an input partial response from an agent to be completed as a multi-objective generative text task; and
generate a plurality of different completed responses to the text input via a trained primal network, wherein each of the plurality of different completed responses comprises the input partial response and a different generated text that completes the input partial response, wherein the agent is to select a response from the plurality of different completed responses as a reply, wherein the primal network and a dual network are trained for the multi-objective generative text task using a Lagrangian loss function representing a plurality of objectives, wherein the plurality of objectives comprises a first objective selected as a primary loss bound by other objectives of the plurality of objectives as thresholds, wherein the primal network is trained to minimize the Lagrangian loss function and the dual network is trained to maximize the Lagrangian loss function, wherein the primal network comprises a step size that is smaller than a step size of the dual network during training.

2. The system of claim 1, wherein the multi-objective generative text task comprises a Markov Decision process comprising a finite state space and a finite action space.

3. The system of claim 1, wherein the primal network is pretrained using a general policy learned from another setting or a random initialization.

4. The system of claim 1, wherein the dual network is randomly initialized during training.

5. The system of claim 1, wherein the processor is to estimate gradients based on a likelihood ratio estimate.

6. The system of claim 1, wherein the multi-objective generative text task comprises a generation task.

7. A computer-implemented method, comprising:
training a primal network and a dual network for a multi-objective generative text task using a Lagrangian loss function representing a plurality of objectives, wherein the plurality of objectives comprises a first objective selected as a primary loss bound by other objectives of the plurality of objectives as thresholds, wherein training the primal network and the dual network comprises training the primal network to minimize the Lagrangian loss function and training the dual network to maximize the Lagrangian loss function, wherein the primal network comprises a step size that is smaller than a step size of the dual network during training;
receiving data comprising text input corresponding to a conversation comprising an input partial response from an agent to be completed as the multi-objective generative text task; and
generate a plurality of different completed responses to the text input via the trained primal network wherein each of the plurality of different completed responses comprises the input partial response and a different generated text that completes the input partial response, wherein the agent is to select a response from the plurality of different completed responses as a reply.

8. The computer-implemented method of claim 7, comprising formulating the multi-objective generative text task as a Markov Decision process comprising a finite state space and a finite action space.

9. The computer-implemented method of claim 7, comprising pretraining the primal network using a general policy learned from another setting or randomly initializing the primal network during training.

10. The computer-implemented method of claim 7, comprising randomly initializing the dual network during training.

11. The computer-implemented method of claim 7, wherein training the primal network and the dual network comprises estimating gradients for the primal network and the dual network based on a likelihood ratio.

12. The computer-implemented method of claim 7, comprising updating policy gradients of the primal network and the dual network based on different step sizes for the primal network and the dual network.

13. The computer-implemented method of claim 7, wherein training the primal network and the dual network comprises alternately training the primal network and the dual network.

14. A computer program product for training neural networks to perform multi-objective tasks, the computer program product comprising a computer-readable storage medium having program code embodied therewith, wherein the computer-readable storage medium is not a transitory signal per se, the program code executable by a processor to cause the processor to:

train a primal network and a dual network for a multi-objective generative text task using a Lagrangian loss function representing a plurality of objectives, wherein the plurality of objectives comprises a first objective selected as a primary loss bound by other objectives of the plurality of objectives as thresholds;

train the primal network to minimize the Lagrangian loss function and train the dual network to maximize the Lagrangian loss function, wherein the primal network comprises a step size that is smaller than a step size of the dual network during training;

receive data comprising text input corresponding to a conversation comprising an input partial response from an agent to be completed for the multi-objective generative text task; and generate a plurality of different completed response to the text input via the trained primal network wherein the plurality of different completed responses comprises the input partial response and a different generated text that completes the input partial response, wherein the agent is to select a response from the plurality of different completed responses as a reply.

15. The computer program product of claim 14, further comprising program code executable by the processor to train the primal network and the dual network using a pre-existing dataset, a simulator, a feedback from an environment, or any combination thereof.

16. The computer program product of claim 14, further comprising program code executable by the processor to pretrain the primal network using a general policy learned from another setting or by randomly initializing the primal network during training.

17. The computer program product of claim 14, further comprising program code executable by the processor to estimate gradients for the primal network and the dual network based on a likelihood ratio.

18. The computer program product of claim 14, further comprising program code executable by the processor to update policy gradients of the primal network and the dual network based on different step sizes for the primal network and the dual network.

19. The computer program product of claim 14, further comprising program code executable by the processor to randomly initialize the dual network during training.

* * * * *